US 11,470,151 B2

(12) United States Patent
Kim et al.

(10) Patent No.: US 11,470,151 B2
(45) Date of Patent: Oct. 11, 2022

(54) SYSTEM, MOBILE TERMINAL AND METHOD FOR STORING DATA INTO WEB STORAGE USING WIRELESS LAN

(71) Applicant: Samsung Electronics Co., Ltd., Gyeonggi-do (KR)

(72) Inventors: Jong Ryul Kim, Seoul (KR); Woo Soon Park, Seoul (KR); Jong Jin Choi, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/929,609

(22) Filed: Jul. 15, 2020

(65) Prior Publication Data

US 2020/0351342 A1 Nov. 5, 2020

Related U.S. Application Data

(63) Continuation of application No. 11/771,866, filed on Jun. 29, 2007, now abandoned.

(30) Foreign Application Priority Data

Jul. 10, 2006 (KR) .............................. 2006-0064631

(51) Int. Cl.
*G06F 13/00* (2006.01)
*H04L 67/1095* (2022.01)
(Continued)

(52) U.S. Cl.
CPC .......... *H04L 67/1095* (2013.01); *H04L 67/04* (2013.01); *H04L 67/06* (2013.01);
(Continued)

(58) Field of Classification Search
CPC ..... H04L 67/04; H04L 67/06; H04L 67/1095; H04L 63/083; H04W 76/005;
(Continued)

(56) References Cited

U.S. PATENT DOCUMENTS 6,351,776 B1  2/2002 O'Brien et al.
6,795,700 B2  9/2004 Karaoguz
(Continued)

FOREIGN PATENT DOCUMENTS

CN  1592464  3/2005
EP  1 104 976  6/2001
(Continued)

OTHER PUBLICATIONS

Chen et al., "Algorithms for supporting disconnected write operations for wireless Web access in mobile client-server environments," IEEE Transactions on Mobile Computing, vol. 1, No. 1, pp. 46-58, Jan.-Mar. 2002.
(Continued)

*Primary Examiner* — Kenneth R Coulter
(74) *Attorney, Agent, or Firm* — The Farrell Law Firm, P.C.

(57) ABSTRACT

A method and an apparatus are provided in which wireless communication is performed through a mobile network. User selection of a hot key enables automatic synchronization of data in a mobile terminal with a web server upon entry into a wireless local area network (LAN) service area. A user ID and password are transmitted to the web server for. A type of data is set to be automatically transmitted based on a user selection. Upon the mobile terminal entering the wireless LAN service area and connecting to the web server, the data is automatically transmitted to the web server. The transmission of the data is stopped and a warning message is displayed, upon the mobile terminal exiting the wireless LAN service area. Upon the mobile terminal re-entering the wireless LAN service area, transmission of the data is automatically resumed from a point where the transmission was stopped, without reauthentication.

10 Claims, 4 Drawing Sheets

(51) Int. Cl.
  *H04W 76/45*       (2018.01)
  *H04L 67/06*       (2022.01)
  *H04L 67/04*       (2022.01)
  *H04W 12/06*       (2021.01)
  *H04W 76/19*       (2018.01)
  *H04W 68/00*       (2009.01)
  *H04L 9/40*        (2022.01)
  *G06F 3/04847*     (2022.01)
  *H04W 84/12*       (2009.01)

(52) U.S. Cl.
  CPC ......... *H04W 12/068* (2021.01); *H04W 68/00* (2013.01); *H04W 76/19* (2018.02); *H04W 76/45* (2018.02); *G06F 3/04847* (2013.01); *H04L 63/083* (2013.01); *H04W 84/12* (2013.01)

(58) Field of Classification Search
  CPC ... H04W 12/068; H04W 76/19; H04W 68/00; H04W 76/45; H04W 84/12; G06F 3/04847
  USPC ......... 709/227–229, 250, 203; 726/2, 3, 4, 5
  See application file for complete search history.

(56) References Cited

U.S. PATENT DOCUMENTS

| | | | |
|---|---|---|---|
| 6,842,770 | B1 | 1/2005 | Serlet et al. |
| 7,158,797 | B1 | 1/2007 | Jayaraman |
| 7,221,961 | B1 | 5/2007 | Fukumoto et al. |
| 7,243,163 | B1 | 7/2007 | Friend et al. |
| 8,121,088 | B2* | 2/2012 | Kim .................... H04W 36/023 455/438 |
| 8,538,433 | B2* | 9/2013 | Kekki .................. H04W 48/17 455/436 |
| 2002/0010696 | A1 | 1/2002 | Izumi |
| 2002/0030750 | A1 | 3/2002 | Mizutani |
| 2002/0078176 | A1 | 6/2002 | Nomura et al. |
| 2002/0120696 | A1 | 8/2002 | Mousseau et al. |
| 2003/0179531 | A1 | 9/2003 | Yamaguchi |
| 2003/0204624 | A1 | 10/2003 | Kushner |
| 2004/0051741 | A1* | 3/2004 | Venturino .......... H04N 1/00474 715/812 |
| 2004/0062227 | A1 | 4/2004 | Sayeedi |
| 2005/0021497 | A1 | 1/2005 | Kohno |
| 2005/0050117 | A1 | 3/2005 | Seo et al. |
| 2005/0088989 | A1 | 4/2005 | Lee et al. |
| 2005/0117566 | A1 | 6/2005 | Davidson |
| 2005/0143094 | A1 | 6/2005 | Reed et al. |
| 2006/0041600 | A1 | 2/2006 | Lehtola et al. |
| 2006/0056336 | A1 | 3/2006 | Dacosta |
| 2006/0069769 | A1 | 3/2006 | Dacosta |
| 2006/0129931 | A1 | 6/2006 | Simons |
| 2006/0182054 | A1 | 8/2006 | Islam et al. |
| 2006/0183475 | A1 | 8/2006 | Willey et al. |
| 2006/0189348 | A1 | 8/2006 | Montulll |
| 2006/0242206 | A1 | 10/2006 | Brezak et al. |
| 2007/0105532 | A1 | 5/2007 | Martin et al. |
| 2007/0169087 | A1 | 7/2007 | Fadell |
| 2008/0080417 | A1* | 4/2008 | Kim .................... H04W 36/023 370/328 |
| 2010/0195621 | A1* | 8/2010 | Kekki .................. H04W 48/17 370/332 |

FOREIGN PATENT DOCUMENTS

| | | |
|---|---|---|
| FR | 2864413 | 6/2005 |
| KR | 10-2002-0042273 | 5/2002 |
| KR | 10-2004-0069574 | 1/2003 |
| KR | 10-2004-0002034 | 1/2004 |
| KR | 10-2005-0040875 | 5/2005 |
| KR | 10-2006-0054527 | 5/2006 |
| WO | WO 03/007639 | 1/2003 |
| WO | WO 2005/069651 | 7/2005 |

OTHER PUBLICATIONS

Jungle Disk, May 2006.
European Search Report dated May 28, 2019 issued in counterpart application No. 19165309.6-1218, 11 pages.
European Search Report dated Nov. 15, 2016 issued in counterpart application No. 16188971.2-1870, 6 pages.
European Search Report dated Nov. 17, 2017 issued in counterpart application No. 17194239.4-1870, 6 pages.

* cited by examiner

SYSTEM, MOBILE TERMINAL AND METHOD FOR STORING DATA INTO WEB STORAGE USING WIRELESS LAN

PRIORITY

This application is a continuation of, and claims priority under 35 U.S.C. § 120 to, U.S. patent application Ser. No. 11/771,866, filed on Jun. 29, 2007 and claiming priority under 35 U.S.C. § 119(a) to Korean Pat. App. Ser. No. 2006-0064631 filed in the Korean Intellectual Property Office on Jul. 10, 2006, the contents of both of which are incorporated herein by reference.

BACKGROUND

1. Field of the Invention

The present invention relates to a system, mobile terminal and method for storing data in a web storage using a wireless Local Area Network (LAN) service, and in particular, to a system and method for storing data stored in a mobile terminal into a web storage using a wireless LAN service when the mobile terminal enters a wireless LAN service area, and to a mobile terminal using the method.

2. Description of the Related Art

Nowadays, using only mobile terminals, users can use various additive functions, for example games, a digital camera, an MP3 player, a scheduler, a housekeeping book and directory functions. Among the functions, users mainly use high-capacity services based on multimedia data, for example, games, still image data, moving image data and MP3 music data. However, mobile terminals have relatively small storage spaces compared with the high-capacity services, and thus the mobile terminals have a limitation in storing multimedia data.

In order to improve a multimedia data storage rate of a mobile terminal, various techniques have been introduced, for example, to expand the capacity of an internal memory of a mobile terminal, mounting a memory card externally on a mobile terminal, transmitting data of a mobile terminal to a Personal Computer (PC) using a Universal Serial Bus (USB) cable, and storing mobile terminal data on the Internet through a wireless Internet connection.

However, expanding the capacity of an internal memory has a problem of increased size of a mobile terminal caused by expansion of the size of the internal memory. Mounting a memory card externally on a mobile terminal has a problem of carrying the mobile terminal with a memory card so as to use multimedia data stored in the memory card. Transmitting mobile terminal data to a PC using a USB cable has a problem of carrying the mobile terminal with a USB cable for connecting to a PC so as to store data stored in the mobile terminal into the PC, otherwise it is impossible to store data in a PC, and the PC also needs to be turned on and be connected to the USB cable. Storing mobile terminal data on the Internet has a relatively slower data transmission speed than transmitting mobile terminal data to a PC, and requires connection to a wireless Internet for data transmission, thereby increasing costs.

SUMMARY

The present invention is made to solve the above-mentioned problems, and therefore, the present invention provides a system, mobile terminal and method for expanding a space for storing a high-capacity service to a web storage, thereby reducing a storage space limitation.

The present invention further provides a system, mobile terminal, and method for reducing the quantity of portable equipments required to use multimedia data stored in an external storage device.

The present invention further provides a system and method for simplifying a procedure for storing mobile terminal data into a web storage, and a mobile terminal thereof.

The present invention further provides a system and method for storing mobile terminal data into a web storage using a wireless LAN service, thereby reducing costs, and a mobile terminal thereof.

The present invention provides a system and method for storing mobile terminal data into a web storage using a wireless LAN service, and a mobile terminal thereof.

A system according to the present invention includes a mobile terminal for sensing entry to a wireless LAN service area to use a wireless LAN service, a wireless connection device for setting the wireless LAN service area, a web server providing a web storage for storing mobile terminal data, and a broadband network for connecting the mobile terminal to the web server.

The mobile terminal may be synchronized with the web server to transmit data stored in the mobile terminal to the web server when entering the wireless LAN service area.

The mobile terminal may set data to be stored into the web storage, wherein the storable data may be, for example, a directory, moving image data, still image data and MP3 music data.

The web server may store data transmitted from the mobile terminal into the web storage.

In accordance with an embodiment of the present invention, a method is provided for a mobile terminal. A user input is received through an input unit including a touch screen. Wireless communication is performed through a mobile network. Performing the wireless communication includes operations of transmitting and receiving voice data, text messages, and multimedia messages through the mobile network. A plurality of types of data including one or more of directory data, moving image data, still image data, and MP3 music data, is stored in a storage of the mobile terminal. A hot key is set. User selection of the hot key enables automatic synchronization of data stored in the mobile terminal with a web server upon entry into a wireless local area network (LAN) service area. The user selection of the hot key is received. The user selection of the hot key corresponds to the user input through the touch screen. Information for entry of a user identification (ID) and password for use in connecting the mobile terminal to the web server is requested. Entry of the user ID and password is received, through the touch screen, for use in connecting the mobile terminal to the web server. The user ID and password are transmitted to the web server for authentication of the mobile terminal by the web server. The web server is connected to upon authentication of the mobile terminal. At least one type of data is set to be automatically transmitted to the web server based on a user selection, from among the plurality of types of data, if the mobile terminal enters the wireless LAN service area. The at least one set type of data includes at least one of the still image data or the moving image data. Information is stored regarding the at least one set type of data. It is determined that the mobile terminal enters the wireless LAN service area. Upon the mobile terminal entering the wireless LAN service area, the web server is connected to. Upon connecting to the web server, the at least one of the still image data or the moving image data from the storage is automatically transmitted to the web server, for storage at the web server. It is determined that the mobile terminal exits the wireless LAN service area before transmission of the at least one of the still image data or the moving image data is completed. The transmission of the at least one of the still image data or the moving image data is stopped and a warning message is displayed on a display indicating that the transmission has stopped, upon determining that the mobile terminal exits the wireless LAN service area. It is determined that the mobile terminal re-enters the wireless LAN service area. Upon determining that the mobile terminal re-enters the wireless LAN service area, transmission of the at least one of the still image data or the moving image data to the web server is automatically resumed from a point where the transmission was stopped, for storage at the web server, without reauthentication. A completion message is displayed on the display, upon completing transmission of the at least one of the still image data or the moving image data to the web server.

In accordance with another embodiment of the present invention, a mobile terminal is provided that includes an input unit including a touch screen, a display, a communication unit, a storage, and a processor. The processor is configured to perform wireless communication through a mobile network. Performing the wireless communication includes operations of transmitting and receiving voice data, text messages, and multimedia messages through the mobile network. A plurality of types of data including one or more of directory data, moving image data, still image data, and MP3 music data, is stored in a storage of the mobile terminal. A hot key is set. User selection of the hot key enables automatic synchronization of data stored in the mobile terminal with a web server upon entry into a wireless LAN service area. The user selection of the hot key is received. The user selection of the hot key corresponds to the user input through the touch screen. Information for entry of a user ID and password for use in connecting the mobile terminal to the web server is requested. Entry of the user ID and password is received through the touch screen, for use in connecting the mobile terminal to the web server. The user ID and password are transmitted to the web server for authentication of the mobile terminal by the web server. The web server is connected to upon authentication of the mobile terminal. At least one type of data is set to be automatically transmitted to the web server based on a user selection, from among the plurality of types of data, if the mobile terminal enters the wireless LAN service area. The at least one set type of data includes at least one of the still image data or the moving image data. Information is stored regarding the at least one set type of data. It is determined that the mobile terminal enters the wireless LAN service area. Upon the mobile terminal entering the wireless LAN service area, the web server is connected to. Upon connecting to the web server, the at least one of the still image data or the moving image data from the storage is automatically transmitted to the web server, for storage at the web server. It is determined that the mobile terminal exits the wireless LAN service area before transmission of the at least one of the still image data or the moving image data is completed. The transmission of the at least one of the still image data or the moving image data is stopped and a warning message is displayed on the display indicating that the transmission has stopped, upon determining that the mobile terminal exits the wireless LAN service area. It is determined that the mobile terminal re-enters the wireless LAN service area. Upon determining that the mobile terminal re-enters the wireless LAN service area, transmission of the at least one of the still image data or the moving image data to the web server is automatically resumed from a point where the transmission was stopped, for storage at the web server, without reauthentication. A completion message is displayed on the display, upon completing transmission of the at least one of the still image data or the moving image data to the web server.

BRIEF DESCRIPTION OF THE DRAWINGS

The objects, features, and advantages of the present invention will become more apparent from the following detailed description in conjunction with the accompanying drawings, in which.

DETAILED DESCRIPTION

Hereinafter, exemplary embodiments of the present invention are described in detail with reference to the accompanying drawings. The same reference symbols identify the same or corresponding elements in the drawings. Detailed descriptions of constructions or processes known in the art may be omitted to avoid obscuring the invention in unnecessary detail.

Figure 1:
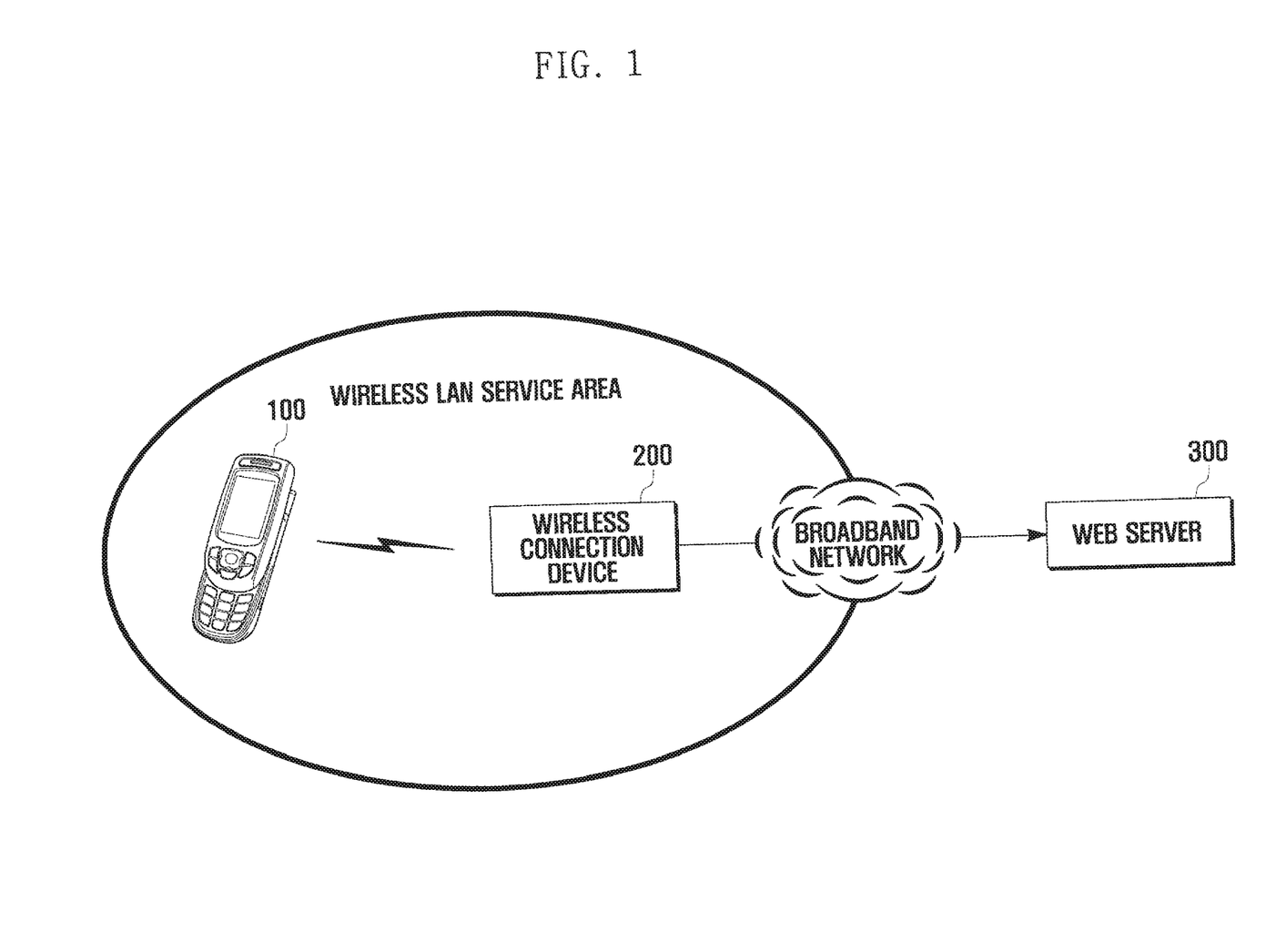
FIG. 1 is a schematic view of a system for storing data into a web storage using a wireless LAN service according to an exemplary embodiment of the present invention.

Referring to FIG. 1, the system includes a mobile terminal 100, a wireless connection device 200, and a web server 300.

Figure 2:
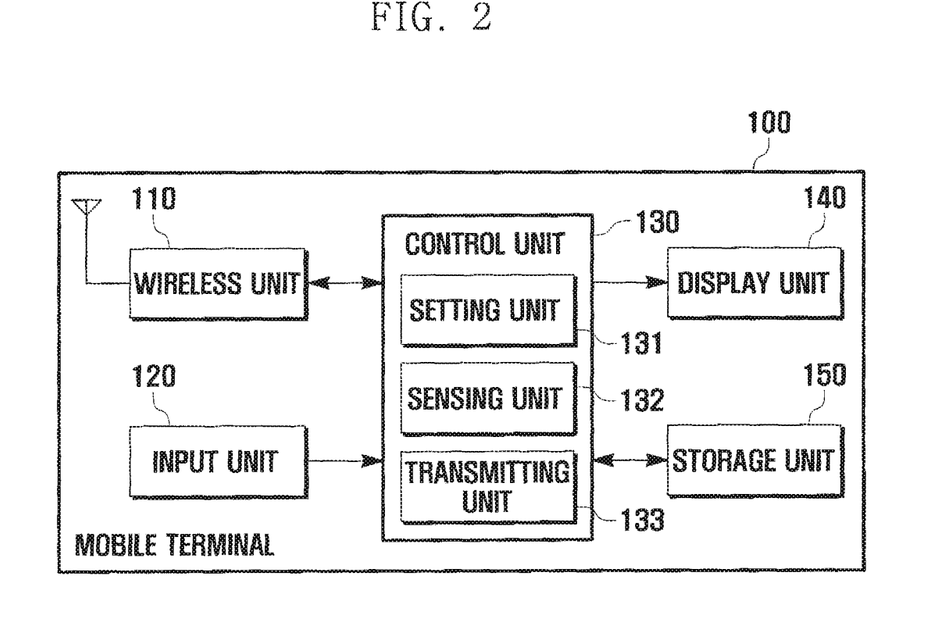
FIG. 2 is a block diagram illustrating a main configuration of a mobile terminal according to an exemplary embodiment of the present invention.

The mobile terminal 100 has a wireless LAN card therein to use a wireless LAN service, and transmits data stored therein to the web server 300 using the wireless LAN service. For this purpose, as shown in FIG. 2, the mobile terminal 100 preferably includes a wireless unit 110; an input unit 120; a control unit 130, which includes a setting unit 131, a sensing unit 132, and a transmitting unit 133; a display unit 140; and a storage unit 150.

The wireless connection device 200 is installed to set a wireless LAN service area. The wireless LAN service area is an area where a wireless LAN service is available, and covers a predetermined distance from a location where the wireless connection device 200 is installed.

Figure 3:
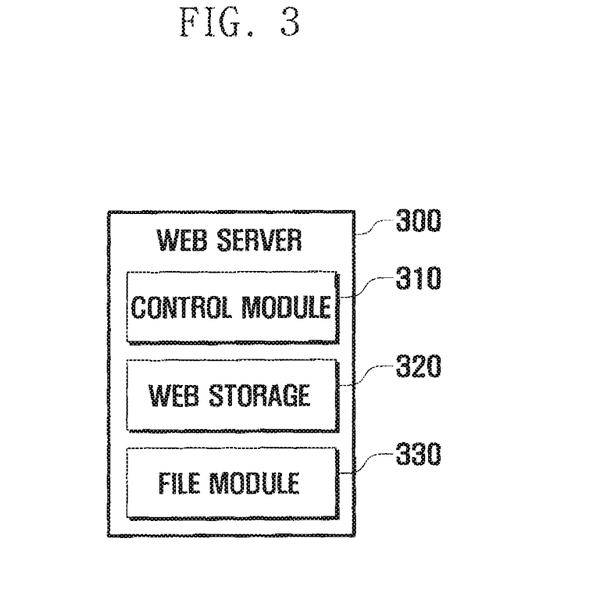
FIG. 3 is a block diagram illustrating a main configuration of a web server according to an exemplary embodiment of the present invention.

The web server 300 provides a web storage service for storing data of the mobile terminal 100. For this purpose, as shown in FIG. 3, the web server 300 preferably includes a control module 310, a web storage 320 and a file module 330.

A main configuration of the mobile terminal 100 is described in detail with reference to FIG. 2. The wireless unit 110 executes wireless communications between the mobile terminal 100 and a mobile network. For example, the wireless unit 110 transmits and receives voice data, text messages and multimedia messages through a wireless network.

The input unit 120 may include keypads, touch screens, touch pads or scroll wheels, and receives operating signals input by a user for controlling an operation of the mobile terminal 100 and provides the operating signals to the control unit 130.

The control unit 130 controls the whole operation to be executed through units of the mobile terminal 100. In particular, the control unit 130 sets synchronization of the web server 300 and the mobile terminal 100, obtains member authentication from the web server 300, and transmits data of the mobile terminal 100 to the web server 300. For this purpose, the control unit 130 preferably includes the setting unit 131, the sensing unit 132 and the transmitting unit 133.

The setting unit 131 sets synchronization of the web server 300 and the mobile terminal 100 including a hot key, a callback Uniform Resource Locator (URL), URL address of the web server 300, etc. The setting unit 131 also sets a specific data stored in the mobile terminal 100 to be stored into the web storage 320. For example, the specific data may be directory data, moving image data, still image data, or MP3 music data. The setting unit 131 also sets a user ID and password by subscribing to the web server 300 to store the specific data into the web storage 320.

The sensing unit 132 senses whether the mobile terminal 100 enters or exits a wireless LAN service area by sensing signals of the wireless connection device 200.

When the sensing unit 132 senses that the mobile terminal 100 enters a wireless LAN service area, the transmitting unit 133 transmits data of the mobile terminal 100 set by the setting unit 131 to the web server 300 through a broadband network. When the sensing unit 132 senses that the mobile terminal 100 exits the wireless LAN service area during data transmission to the web server 300, the transmitting unit 133 stops transmission of the data of the mobile terminal 100. Thereafter, if the sensing unit 132 senses that the mobile terminal 100 reenters the wireless LAN service area, the transmitting unit 133 retransmits the data, transmission of which to the web server 300 was stopped due to the mobile terminal 100 exiting the wireless LAN service area, from a stopped portion of transmitted data or from a start of the data transmission.

The display unit 140 displays the state and result of various operations executed in units of the mobile terminal 100, and a plurality of information, by control of the control unit 130. Particularly, when data of the mobile terminal 100 set by the setting unit 131 is completely stored into the web storage 320, the display unit 140 displays a storage completion message. When the mobile terminal 100 exits the wireless LAN service area, the display unit 140 displays a warning message informing that data transmission has stopped. If the mobile terminal 100 reenters the wireless LAN service area, the display unit 140 displays a message to select whether the transmitting unit 133 should retransmit the data whose transmission was stopped from a stopped portion of the data or from the start of the data.

The storage unit 150 stores data (for example, a setting state or data about a menu) related to operation of the mobile terminal 100 by control of the control unit 130. The storage unit 150 also stores a hot key, a callback URL, and URL address of the web server 300 for setting synchronization of the web server 300 with the mobile terminal 100 by the setting unit 131, and stores specific data of the mobile terminal 100 to be stored into the web storage 320 provided by the web server 300. The storage unit 150 also stores the user ID and password required for connection to the web server 300 set by the setting unit 131.

Referring to FIG. 3, the control module 310 controls the whole operation to be executed in the units of the web server 300. Particularly, the control module 310 executes member authentication through the user ID and password set in the mobile terminal 100.

The web storage 320 stores data of the mobile terminal 100 transmitted to the web server 300 through a broadband network by control of the control module 310.

In the case that specific data stored in the web storage 320 is lost or damaged, the file module 330 executes a system file check by changing the name of the data and restoring the data into a stored version of the data by control of the control module 310.

Figure 4:
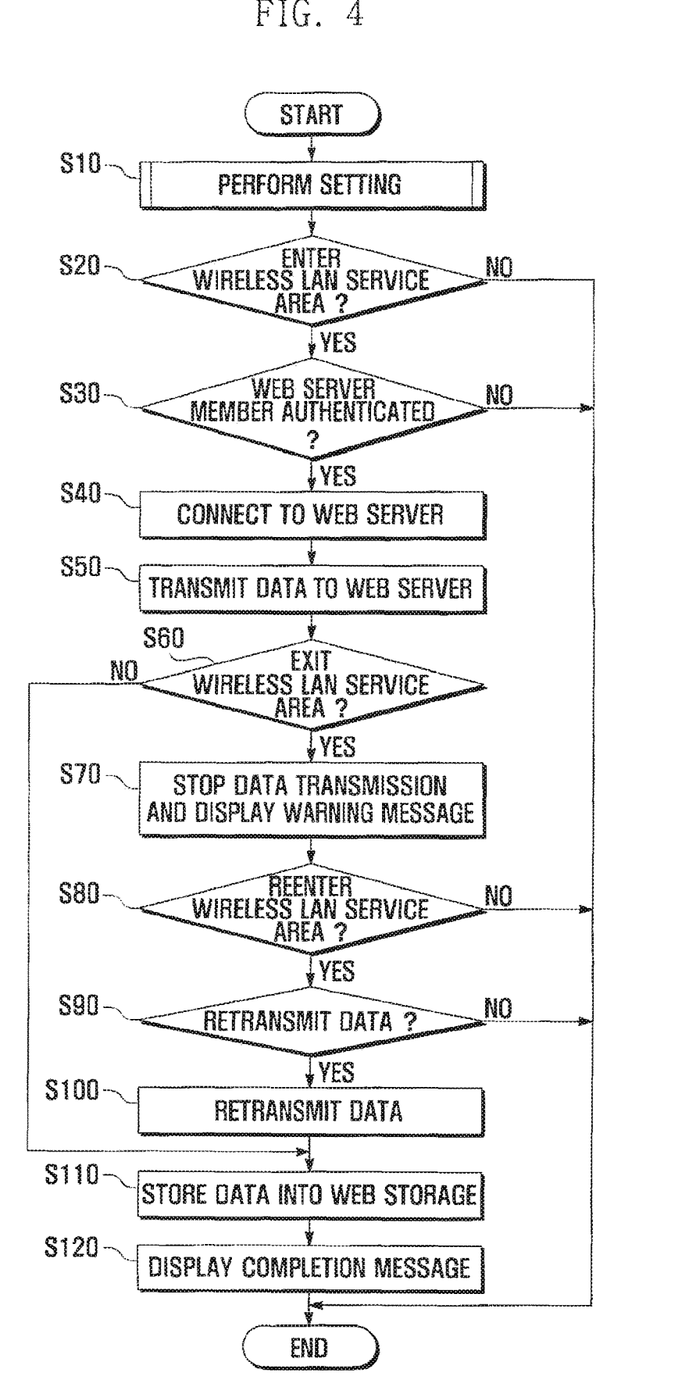
FIG. 4 is a flowchart of a method for storing data into a web storage using a wireless LAN service according to an exemplary embodiment of the present invention.

Referring to FIG. 4, the control unit performs setting of the mobile terminal 100 and the web server 300 so as to transmit data of the mobile terminal 100 to the web server 300 (S10). Step S10 of performing setting is described in detail with reference to FIG. 5 as follows.

Figure 5:
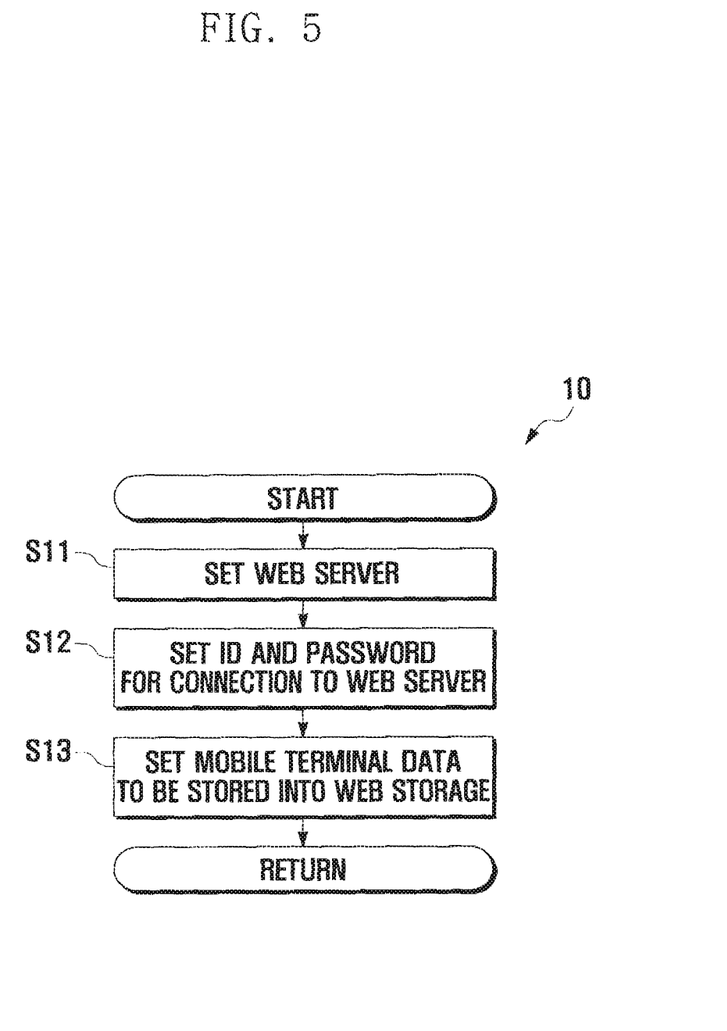
FIG. 5 is a detailed flowchart of a service-setting step for using a wireless LAN service according to an exemplary embodiment of the present invention.

Referring to FIG. 5, the control unit 130 sets synchronization of the web server 300 and the mobile terminal 100 including the hot key, the callback URL, a URL address, etc., so as to store specific data stored in the storage unit 150 of the mobile terminal 100 into the web storage 320 provided by the web server 300, in step S11. The control unit 130 sets the user ID and password for connection to the web server 300 set at step S11, in step S12, then sets the specific data stored in the storage unit 150 of the mobile terminal 100 to be stored into the web storage 150, in step S13. The specific data may be directory data, moving image data, still image data or MP3 music data. The specific data may be set by the user whenever the mobile terminal 100 enters the wireless LAN service area, or may be set previously by the user to be automatically executed when the mobile terminal 100 enters the wireless LAN service area. Preferably, performing setting at step S10 is executed by the setting unit 131 of the control unit 130.

The control unit 130 senses whether the mobile terminal 100 enters the wireless LAN service area having the wireless connection device 200, in step S20. Preferably, the sensing is executed by the sensing unit 132 of the control unit 130.

If the control unit 130 senses that the mobile terminal 100 enters the wireless LAN service area, the control unit 130 transmits the user ID and password set for connection to the web server 300 to determine whether the user of the mobile terminal 100 is authenticated by the web server 300 as a member of the web server 300 in step S30. Member authentication may be obtained by inputting the ID and password whenever the mobile terminal 100 is connected to the web server 300, or may be obtained when synchronization of the mobile terminal 100 with the web server 300 is executed, and thus in the case of reconnection, the authentication step may be omitted.

If the user is authenticated as a member of the web server 300, the control unit 130 is connected to the web server 300 in step S40.

The control unit 130 then transmits the set specific data of the mobile terminal 100 to the web server 300 through a broadband network in step S50. Preferably, the transmission of the data is executed by the transmitting unit 133 of the control unit 130.

The sensing unit 132 of the control unit 130 senses whether the mobile terminal exits the wireless LAN service area during data transmission in step S60. If the mobile terminal 100 exits the wireless LAN service area during data transmission, the control unit 130 controls the display unit 140 to display a warning message notifying that data transmission is stopped and controls the transmission unit 133 to stop data transmission to the web server 300 in step S70.

The sensing unit 132 of the control unit 130 senses whether the mobile terminal 100 reenters the wireless LAN service area in step S80. If the mobile terminal 100 reenters the wireless LAN service area, the control unit 130 determines whether to retransmit the data whose transmission was stopped in step S90. If the data is to be retransmitted, the transmission unit 133 retransmits the data from a stopped portion of the data or from the start of the data in step S100.

If the mobile terminal 100 does not exit the wireless LAN service area at step S60, the control unit 100 continues transmission of the set specific data to the web server 300 through a broadband network, and the process continues at step S110.

The web storage 320 of the web server 300 stores the data transmitted from the transmitting unit 133 of the mobile terminal 100 by control of the control module 310 in step S110.

When the data transmitted from the transmitting unit 133 of the mobile terminal 100 to the web server 300 is completely stored into the web storage 320, the control unit 130 controls the display unit 140 to display a storage completion message in step S120.

As described above, the present invention has an effect of expanding a storage space for storing mobile terminal data to a web storage, thereby reducing a limitation of the storage space.

The present invention also has an effect of storing data of a mobile terminal into a web storage without requiring a connecting cable between the mobile terminal and a PC, thereby overcoming a problem of limited space and equipment.

Further, the present invention has an effect of storing data of a mobile terminal into a web storage in a wireless LAN service area, thereby reducing costs rendered in connection to a wireless Internet.

While exemplary embodiments of the present invention have been shown and described in this specification, it will be understood by those skilled in the art that various changes or modifications of the embodiments are possible without departing from the spirit and scope of the invention as defined by the appended claims.

What is claimed is:

1. A method for a mobile terminal, comprising:
   receiving a user input through an input unit including a touch screen;
   performing wireless communication through a mobile network, wherein performing the wireless communication comprises operations of transmitting and receiving voice data, text messages, and multimedia messages through the mobile network;
   storing, in a storage of the mobile terminal, a plurality of types of data including one or more of directory data, moving image data, still image data, and MP3 music data;
   setting a hot key, wherein a first user selection of the hot key enables automatic synchronization of data stored in the mobile terminal with a web server upon entry into a wireless local area network (LAN) service area;
   receiving the first user selection of the hot key, wherein the first user selection of the hot key corresponds to the user input through the touch screen;
   requesting information for entry of a user identification (ID) and password for use in connecting the mobile terminal to the web server;
   receiving entry of the user ID and password, through the touch screen, for use in connecting the mobile terminal to the web server;
   transmitting the user ID and password to the web server for authentication of the mobile terminal by the web server;
   connecting to the web server upon authentication of the mobile terminal;
   setting at least one type of data to be automatically transmitted to the web server based on a second user selection, from among the plurality of types of data, if the mobile terminal enters the wireless LAN service area, wherein the at least one set type of data includes at least one of the still image data or the moving image data;
   storing information regarding the at least one set type of data;
   determining that the mobile terminal enters the wireless LAN service area;
   upon the mobile terminal entering the wireless LAN service area, connecting to the web server;
   upon connecting to the web server, automatically transmitting the at least one of the still image data or the moving image data from the storage to the web server, for storage at the web server;
   determining that the mobile terminal exits the wireless LAN service area before transmission of the at least one of the still image data or the moving image data is completed;
   stopping the transmission of the at least one of the still image data or the moving image data and displaying a warning message on a display indicating that the transmission has stopped, upon determining that the mobile terminal exits the wireless LAN service area;
   determining that the mobile terminal re-enters the wireless LAN service area;
   upon determining that the mobile terminal re-enters the wireless LAN service area, automatically resuming transmission of the at least one of the still image data or the moving image data to the web server from a point where the transmission was stopped, for storage at the web server, without reauthentication; and
   displaying a completion message on the display, upon completing transmission of the at least one of the still image data or the moving image data to the web server.

2. The method of claim 1, further comprising:
   storing the user identification and password.

3. The method of claim 1, wherein determining that the mobile terminal enters the wireless LAN service area comprises:
   sensing a wireless connection device for setting the wireless LAN service area.

4. The method of claim 1, wherein authentication of the mobile terminal comprises authenticating the mobile terminal as a member of the web server.

5. The method of claim 1, further comprising:
   upon stopping the transmission, storing the point where the transmission was stopped.

6. A mobile terminal comprising:
   an input unit including a touch screen;
   a display;
   a communication unit;
   a storage; and
   a processor configured to:
     perform wireless communication through a mobile network, wherein performing the wireless communication comprises operations of transmitting and receiving voice data, text messages, and multimedia messages through the communication unit;

store, in the storage of the mobile terminal, a plurality of types of data including one or more of directory data, moving image data, still image data, and MP3 music data setting a hot key, wherein a first user selection of the hot key enables automatic synchronization of data stored in the mobile terminal with a web server upon entry into a wireless local area network (LAN) service area;

receive the first user selection of the hot key, wherein the first user selection of the hot key corresponds to user input through the touch screen;

request information for entry of a user identification (ID) and password for use in connecting the mobile terminal to the web server;

receive entry of the user ID and password, through the touch screen, for use in connecting the mobile terminal to the web server;

transmit the user ID and password to the web server for authentication of the mobile terminal by the web server;

connect to the web server upon authentication of the mobile terminal;

set at least one type of data to be automatically transmitted to the web server based on a second user selection, from among the plurality of types of data, if the mobile terminal enters the wireless LAN service area, wherein the at least one set type of data includes at least one of the still image data or the moving image data;

store information regarding the at least one set type of data;

determine that the mobile terminal enters the wireless LAN service area;

upon the mobile terminal entering the wireless LAN service area, connecting to the web server;

upon connecting to the web server, automatically transmit the at least one of the still image data or the moving image data from the storage to the web server, for storage at the web server;

determine that the mobile terminal exits the wireless LAN service area before transmission of the at least one of the still image data or the moving image data is completed;

stop the transmission of the at least one of the still image data or the moving image data and displaying a warning message on the display indicating that the transmission has stopped, upon determining that the mobile terminal exits the wireless LAN service area;

determine that the mobile terminal re-enters the wireless LAN service area;

upon determining that the mobile terminal re-enters the wireless LAN service area, automatically resume transmission of the at least one of the still image data or the moving image data to the web server from a point where the transmission was stopped, for storage at the web server, without reauthentication; and display a completion message on the display, upon completing transmission of the at least one of the still image data or the moving image data to the web server.

7. The mobile terminal of claim 6, wherein the processor is further configured to:
store the user identification and password.

8. The mobile terminal of claim 6, wherein, in determining that the mobile terminal enters the wireless LAN service area, the processor is further configured to:
sense a wireless connection device for setting the wireless LAN service area.

9. The mobile terminal of claim 6, wherein authentication of the mobile terminal comprises authenticating the mobile terminal as a member of the web server.

10. The mobile terminal of claim 6, wherein the processor is further configured to:
upon stopping the transmission, store the point where the transmission was stopped.

* * * * *